(No Model.)

C. E. LITTLE.
VEHICLE SEAT LOCK.

No. 442,630. Patented Dec. 16, 1890.

Witnesses:

Inventor
Charles E. Little,
By his Attorneys,

UNITED STATES PATENT OFFICE.

CHARLES E. LITTLE, OF MOUNT CARROLL, ILLINOIS.

VEHICLE-SEAT LOCK.

SPECIFICATION forming part of Letters Patent No. 442,630, dated December 16, 1890.

Application filed June 10, 1890. Serial No. 354,875. (No model.)

*To all whom it may concern:*

Be it known that I, CHARLES E. LITTLE, a citizen of the United States, residing at Mount Carroll, in the county of Carroll and State of Illinois, have invented a new and useful Vehicle-Seat Fastener, of which the following is a specification.

My invention relates to improvements in seat-fasteners; and it consists in certain novel features hereinafter described and claimed.

Figure 1:
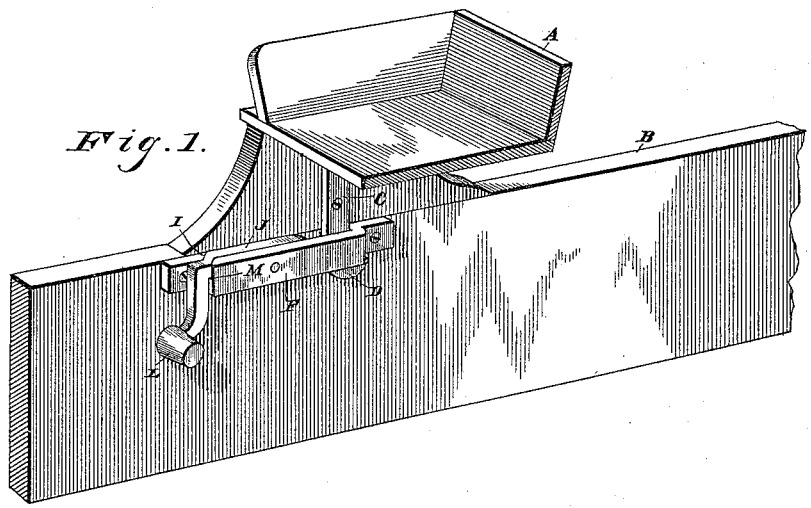
Figure 2:
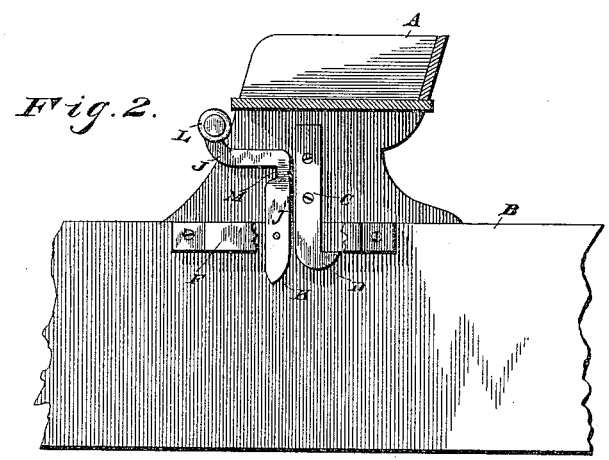
Figure 3:
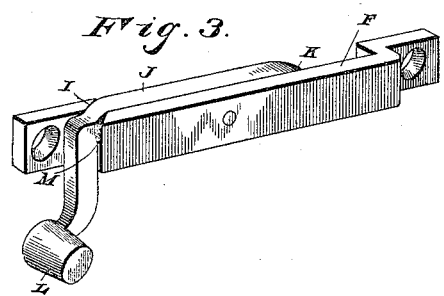

In the accompanying drawings, Figure 1 is a perspective view of my improved seat-lock. Fig. 2 is a side view showing the parts of the lock adjusted to permit the removal of the seat. Fig. 3 is a detail perspective view of the lever and the keeper.

The seat A and the side rails b are of the usual or any preferred construction, and to the risers or end bars of the seats I secure the latches C, which are provided at their lower ends in their rear edges with the hooks D.

The keepers H are provided at their front ends with the notches I, the purpose of which will presently appear. A lever J, having a curved end K, is pivoted between the keepers, and the side rail is provided with a weighted front end or handle L and has a notch M in its lower edge near its front end. In practice the lever J normally lies in a substantially horizontal position, the notch M therein interlocking with the notch I in the keeper, as will be readily understood. When it is desired to secure the seat in position, it is placed on the side rails, with the latches C passing down through the keepers. The seat is then pushed rearward, so as to bring the hook D into engagement with the keepers, thereby fastening the seat at the proper point. As the latches are passed downward through the keepers they will strike the curved ends of the weighted keepers, and thereby depress the said ends and raise their weighted front ends.

As the seat is moved rearward the weighted ends of the levers will return the same to their normal positions, so that their rear ends bear against the front edges of the latches and thereby lock the same in engagement with the keepers. When it is desired to remove the seat, the levers are turned so as to permit the seat to be moved forward, and the seat is then moved and raised, as will be readily understood.

From the foregoing description, taken in connection with the accompanying drawings, it will be seen that I have provided a seat-lock by which the seat will be firmly secured in its proper position and held against accidental displacement.

Having thus described my invention, what I claim, and desire to secure by Letters Patent, is—

1. The combination of the keeper, the latch passing through the same and engaging its rear end, and the lever pivoted in the keeper, with its rear end normally bearing against the latch and its front end weighted and bent out of the plane of its body, the keeper and lever having interlocking notches, substantially as shown and described.

2. The combination of the keeper, the latch passing through the same and engaging its rear end, and the lever pivoted in the keeper, with its rear end normally bearing against the latch and its front end weighted and bent out of the plane of its body, substantially as set forth.

In testimony that I claim the foregoing as my own I have hereto affixed my signature in presence of two witnesses.

C. E. LITTLE.

Witnesses:
 NELSON FLETCHER,
 B. L. SMITH.